(12) United States Patent
Calvert et al.

(10) Patent No.: US 6,450,124 B1
(45) Date of Patent: Sep. 17, 2002

(54) PORTABLE CORRAL

(76) Inventors: Edward Earl Calvert, 24462 Black Ranch Rd., Borney, CA (US) 96013; Fred D. Baker, 1968 Carneo Ct., Redding, CA (US) 96002

( * ) Notice: Subject to any disclaimer, the term of this patent is extended or adjusted under 35 U.S.C. 154(b) by 1 day.

(21) Appl. No.: 09/825,742

(22) Filed: Apr. 3, 2001

(51) Int. Cl.$^7$ ................................................. A01K 3/00
(52) U.S. Cl. ........................ 119/512; 119/519; 119/843
(58) Field of Search ................................. 119/512, 513, 119/514, 518, 519, 840, 843

(56) References Cited

U.S. PATENT DOCUMENTS

| | | | | |
|---|---|---|---|---|
| 3,931,796 A | * | 1/1976 | Hoffman | 119/510 |
| 4,201,157 A | * | 5/1980 | Lambert | 119/512 |
| 4,250,836 A | * | 2/1981 | Smith | 119/512 |
| 4,499,856 A | * | 2/1985 | Hecht et al. | 119/843 |
| 4,537,151 A | * | 8/1985 | Bolton | 119/512 |
| 4,821,679 A | * | 4/1989 | Hackert | 119/502 |
| 4,924,813 A | * | 5/1990 | Bixler et al. | 119/512 |
| RE33,959 E | * | 6/1992 | Mollhagen | |
| 5,669,332 A | * | 9/1997 | Riley | 119/724 |
| 5,899,171 A | * | 5/1999 | Abrahamson | 119/512 |
| 6,021,742 A | * | 2/2000 | Cummings | 119/502 |
| 6,035,808 A | * | 3/2000 | Herman | 119/512 |
| 6,067,940 A | * | 5/2000 | Holder | 119/512 |

* cited by examiner

*Primary Examiner*—Yvonne R. Abbott
(74) *Attorney, Agent, or Firm*—Donald R. Boys; Central Coast Patent Agency, Inc.

(57) ABSTRACT

A trailer mountable portable corral system for enclosing animals. The system has, a first portion of the corral system having at least one corral panel and a corral gate, a first lifting mechanism mounted to the trailer and connected to the panel of the first portion of the corral system at an end not connected to another panel or gate, a second portion of the corral system having at least one corral panel and a second lifting mechanism mounted to the trailer and connected to the panel of the second portion of the corral system at an end not connected to another panel. A user operating either the first or second lifting mechanism may cause lifting and lowering of either portion of the corral system connected thereto.

24 Claims, 10 Drawing Sheets

Hinge Opened Position

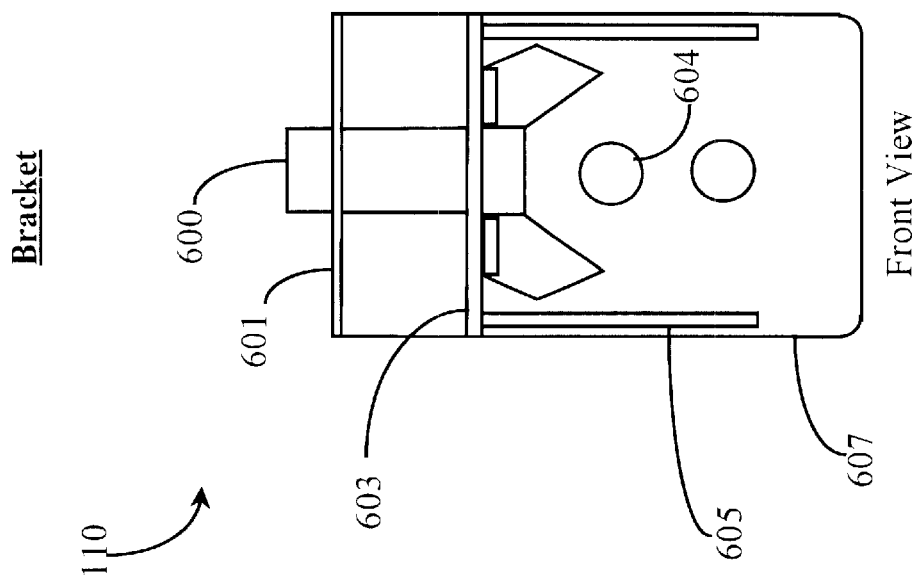

Pallet Template For HC Install

Pallet Template (Side View)

PORTABLE CORRAL

FIELD OF THE INVENTION

The present invention is in the field of corrals for domestic animals including horse corrals, and pertains particularly to a method and apparatus for providing an improved portable horse corral.

BACKGROUND OF THE INVENTION

The art of corralling animals, particularly horses, requires the assembly of a corral structure to keep the animals in one location. A typical prior-art horse corral comprises a plurality of structured panels having leg apertures, which are assembled, most often by wire, to form the corral enclosure. Ranchers and other horse owners, including hunters, typically load such corral panels separately into a trailer or other vehicle for transporting animals when they travel with their animals. Horses, in particularly are transported to rodeos, equestrian contests, destinations for hunting trips and so on.

Corral panels must be constructed of a suitably strong material for the practical purpose of containing the animals such that they cannot breach the enclosure. The most common material is welded steel pipe or tubing. Single panels are generally somewhat heavy in weight and can be difficult and dangerous for one individual to handle during construction of a corral and when loading and unloading the panels from a trailer. Moreover, handling separate panels, which must be assembled by wiring or other standard methods, is time consuming and may at times produce frustration, especially if animals are upset or spooked and must be corralled quickly.

A portable corral is known to the inventor and is included in this specification by reference as U.S. Pat. No. 4,537,151, by inventors Bolton et al., and referred to herein as Bolton. Bolton attempts to provide a solution to the difficulties of handling and assembling separate panels into a corral by providing a portable corral that may be mounted to a horse trailer.

Referring to FIG. 1 of Bolton, Bolton teaches a potable corral comprising a plurality of separate panels 14 connected together by sleeves 22 that fit over vertical panel members 16. Sleeved connections enable the corral panels to be folded along their lengths (see FIGS. 4–5). The panels have legs 24 attached thereto by pins (not shown), which are inserted into openings provided in the legs for the purpose. The corral, once assembled, is fitted on one end over a vertical pipe (element 32, FIG. 5) secured to a horse trailer 12.

Referring now to FIGS. 9 and 10 of Bolton, a mechanical winch apparatus (pulley and cable) is used to lift the corral after it has been assembled and folded so it may be maneuvered into position to be secured to the side of the trailer while resting on a vertical support member 56 that is also attached to the trailer. After the corral is assembled, folded, lifted, and secured to the trailer it can be driven as a portable corral. When a desired destination is reached it is lifted off of its support member using the winch. The folded panels are then swung out away from the trailer and then lowered to ground level whereupon it may be un-tethered and unfolded to form a useable corral. The panel on the free end of the assembled corral acts as a gate.

The portable corral taught by Bolton provides some relief from work associated with wiring or hand assembling separate panels together through provision of sleeved panel junctions. Similarly, provision of the winch apparatus enables easier lifting of the folded corral off of the ground for trailer mounting and off of the trailer support for setting up the corral. However, there are several limitations presented by the corral of Bolton.

One of the limitations of Bolton's corral is that loading and unloading the corral requires at least 2 people for practical implementation. Referring back to FIG. 10, while one user is operating winch handle 75, another user is required to guide the swing-out or swing-in of the folded corral depending on whether loading or unloading from the trailer. Additionally, the legs must be adjusted using pins adding considerable set-up time for forming the corral after unloading.

Another limitation of Bolton is the weight of the corral. Referring back to FIG. 10, the location of the winch support arm must be close to the support pipe in order to lift the folded corral without compromising slide ability along the support pipe. The corral is not supported on the end opposite the winch causing a requirement for an additional person to help lift the other end. Because of this fact, the corral is weight-limited, meaning that it must be light enough and small enough to fit on a shorter trailer. A much longer (folded dimension) corral could add enough weight to the operation to compromise the vertical support pipe by putting undue stress on it's mounting locations and hardware.

Yet another limitation of Bolton is that Bolton's corral is perimeter-limited, meaning that it is designed only for one, or possibly two horses to be corralled comfortably. This limitation is partly dictated by the means of lifting used (winch) and the location of the attaching winch cable. It is also partly dictated by the method of construction of the corral, resulting in all panels of the corral being conjoined together as one unit. Contributing weight limitation forces the panels themselves to be constructed relatively short in length.

A limitation to Bolton is also evident in the construction of the panel junctions, limiting the corral in terms of overall folded width extending from the trailer side in mounted position. That is, the fact that sleeves 22 by virtue of their nature and function must be considerably larger in diameter than the vertical members that they fit over. Therefore, the folded width dimension is dictated by the collective width of the folded sleeves rather than that of the actual collective width of the vertical members aligned in folded position. The actual panel members must be provided of a considerably smaller diameter than what would be possible if they could be folded in aligned position without the sleeves.

What is clearly needed to overcome the limitations described above is a method and apparatus enabling a large-perimeter potable horse corral that may be efficiently set-up, re-mounted to the side of a trailer in a minimum amount of time, by a single user exerting a minimum of effort.

SUMMARY OF THE INVENTION

In a preferred embodiment of the present invention, a portable corral system mountable to a trailer for enclosing animals is provided. The portable corral system comprises, a first portion of the corral system having at least one corral panel and a corral gate connected together at their common junction(s), a first lifting mechanism mounted to the trailer and connected to the panel of the first portion of the corral system at an end not connected to another panel or gate, a second portion of the corral system having at least one corral panel connected together, in the case of more than one panel, at their common junctions and a second lifting mechanism mounted to the trailer and connected to the panel of the second portion of the corral system at an end not connected to another panel. A user operating either the first or second lifting mechanism may cause lifting and lowering of either portion of the corral system connected thereto.

In a preferred embodiment, the first and second lifting mechanisms each comprise a hydraulic jack operably mounted to a carriage device. In this embodiment, the carriage device comprises at least a top plate, a base plate, a carriage and at least two carriage runners enabling the carriage to side freely. In one aspect, piano style hinges are used to connect the panel(s) and gate of the first portion of the corral system. In another aspect, piano style hinges are used to connect the panels of the second portion of the corral system in the case of more than one panel. In another aspect, the first and second portions of the corral system are modular and interchangeable with respect to mounted position on the trailer. In a preferred embodiment, the hydraulic Jacks are manually operated. In an alternative embodiment, the hydraulic jacks are electronically operated. In another alternative embodiment, the first and second lifting mechanisms each comprise a ratchet style Jack mounted to a carriage device.

In a preferred aspect of the corral system, at least two barrel style hinges are used to connect each of the first and second portions of the corral system to respective first and second lifting mechanisms. In this aspect, the hinges connected to one lifting mechanism assume an offset position in a direction toward the vertical center of the trailer and then away from the wall of the trailer with respect to the location of the hinges connected to the other lifting mechanism. In all aspects, the panels and gate making up the first and second portions of the corral system are supported off of the ground by vertical legs distributed one each for the panels and one for the gate. In this aspect, the vertical legs are contiguous and of the same material with respect to the host panels or gate.

In another aspect of the corral system, a lifting device is provided for a portable corral system, the corral system mountable to a trailer and having a first and second separable portion thereof the sum of portions including at least 2 corral panels and at least one corral gate connected together at their common junctions respective to their host portions. The lifting device comprises, at least two elongated runners held substantially parallel to one another and in substantially the same plane by a connected base plate and a connected top-plate, a carriage for traveling on the runners in a slidable manner, a jack having a bottom portion thereof fixedly mounted to the base plate and a lift aperture thereof fixedly mounted to the carriage and at least two hinges attached to the carriage for securing a separable portion of the corral system to the lifting device. Operation of the lifting device causes the carriage to be raised and lowered along the length of the runners thereby causing lifting and lowering of the connected portion of the trailer-mounted corral system.

In a preferred embodiment, the device is mounted to the trailer at the locations of the base plate and the top plate. Also in a preferred embodiment, the jack is hydraulic and is manually operated. In an alternative embodiment, the jack is hydraulic and is electronically operated. In another alternative embodiment, the jack is a ratchet style jack and is manually operated. In one aspect, the carriage further comprises at least two L-brackets fixedly attached thereto and supported by an elongated vertical member positioned adjacent to the carriage, the vertical member attached to the carriage and to the L-brackets. The at least two hinges are, in this embodiment, attached one per to the at least two L-brackets in order to provide an offset position for the hinges.

In another aspect of the present invention, a method for setting up a trailer-mounted corral from a folded and locked position on the trailer is provided. The corral having a first and second separable portion thereof each controlled by a separate hydraulic lifting device, the first portion having at least one panel and a gate, the second portion having at least one panel, the panel(s) and gate connected together at their common junctions respective to their host portions. The method comprises the steps of, (a) unlocking the folded corral portions and removing the locking mechanisms, (b) swinging out and unfolding the connected panel(s) of the second portion of the corral to a position substantially 90 degrees from the folded and locked position, (c) swinging out and unfolding the connected panel(s) of the first portion of the corral, the position substantially 90 degrees from the folded and locked position and (d) unfolding the gate of the first portion of the corral such that the free end of the gate may be latched to the panel of the second portion having a free end adapted to accept the latch.

In another aspect of the present invention, a method for loading a trailer-mounted corral from a set up position to a folded and locked position on the trailer is provided. The corral having a first and second separable portion thereof each controlled by a separate hydraulic lifting device, the first portion having at least one panel and a gate, the second portion having at least one panel, the panel(s) and gate connected together at their common junctions respective to their host portions. The method comprises the steps of, (a) unlatching the gate of the first portion of the corral and folding it flush against its adjacent and connected panel by walking it into the corral, (b) lifting the first portion of the corral until the leg of the panel closest to the trailer clears the ground, (c) grasping the gate and its adjacent panel in folded position walking in towards the trailer accomplishing the final fold of the first portion of the corral, (d) lifting the folded first portion of the corral to a position just above brackets and the running board of the trailer using the appropriate lifting device, (e) positioning the folded first portion of the corral over the brackets and flush against the trailer while simultaneously lowering the first portion to rest on the brackets using the appropriate lifting device, (f) lifting the extended second portion of the corral until the leg of the panel closest to the trailer clears the ground, (g) grasping the panel furthest from the trailer at the free end and walking it in towards the trailer accomplishing a folded position of the two panels of the second portion, (h) lifting the folded second portion of the corral to a position just above the brackets and running board of the trailer using the appropriate lifting device, (I) positioning the folded second portion of the corral over the brackets and flush against the folded first portion while simultaneously lowering the second portion to rest on the brackets using the appropriate lifting device; and (J) inserting and engaging the locking mechanisms to lock the folded corral in place against the trailer.

In alternative aspect of the method in steps (c), there is only one panel and one gate eliminating the need for a second fold. In this aspect in step (g) there is only one panel eliminating the need for a fold.

Now, for the first time, a method and apparatus enabling a large-perimeter potable horse corral to be efficiently set-up and re-mounted to the side of a trailer in a minimum amount of time, by a single user, exerting a minimum of force is provided.

BRIEF DESCRIPTION OF THE DRAWING FIGURES

FIG. 6a is a front view of the bracket of FIG. 1.

FIG. 6b is a side view of the bracket of FIG. 6a.

DESCRIPTION OF THE PREFERRED EMBODIMENTS

According to a preferred embodiment of the present invention, an improved portable corral is provided having novel enhancements over prior-art portable corrals. The method and apparatus of the present invention is explained in enabling detail below.

Figure 1:
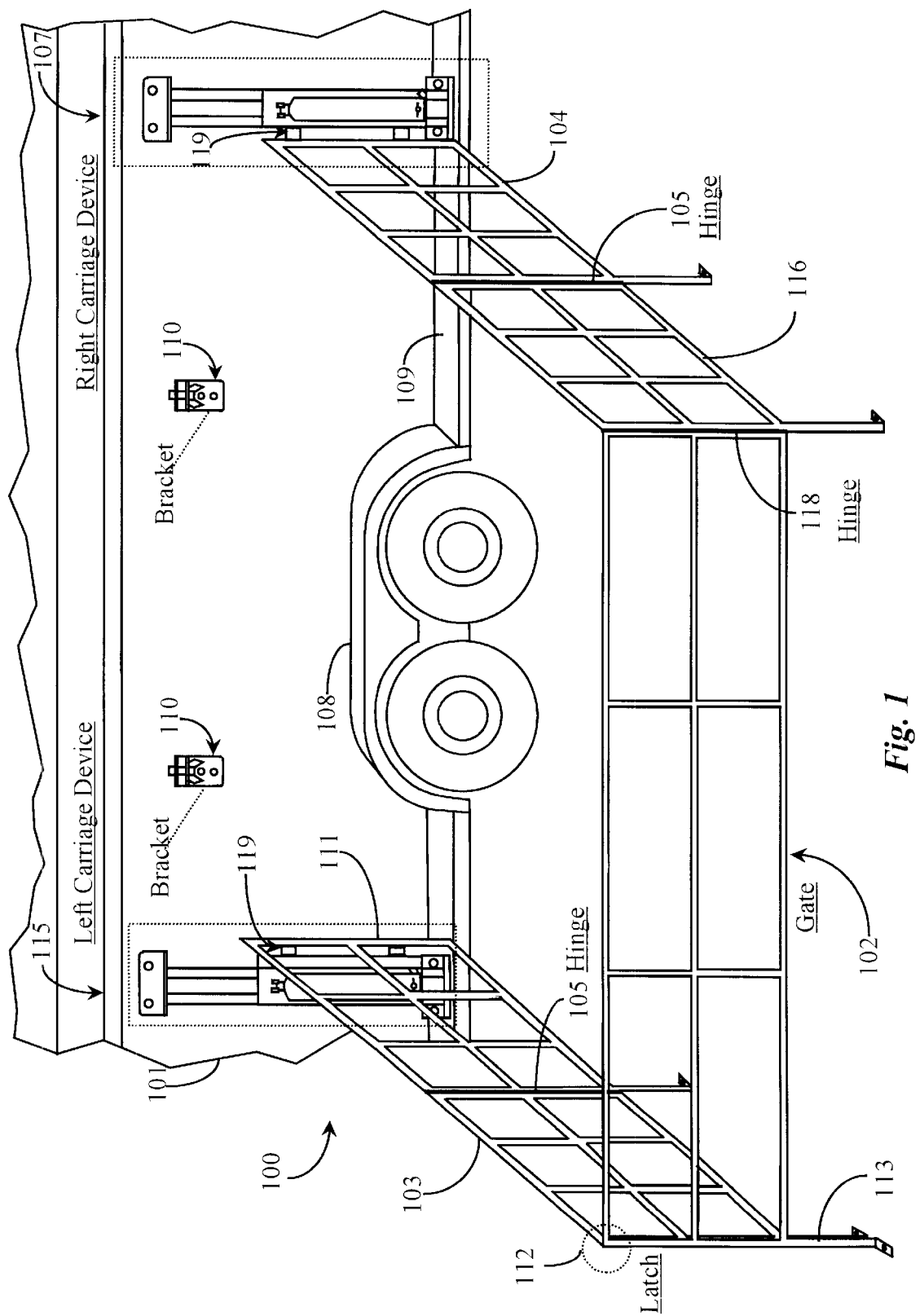
FIG. 1 is a perspective view of a portable horse corral mounted to a horse trailer according to an embodiment of the present invention.

FIG. 1 is a perspective view of a portable corral 100 mounted to a horse trailer 101 according to an embodiment of the present invention. Corral 100 is designed and adapted to be mounted on trailer 101 and to retain a mounted position on trailer 101 until corralling animals is required. Trailer 101 is, in a preferred. embodiment, a long horse trailer of approximately 14 feet in length or more. Trailer 101, as is typical with most trailers, has a wheel well 108 provided thereon for the purpose of covering trailer wheels. Trailer 101 also has a running board 109 provided thereon as is the case with most typical trailers in the art. The front and back portions of trailer 101 are not illustrated in this example because they are not important to the present invention.

Corral 100 is a fully assembled corral that is provided in the form of two separate portions comprising a right-side assembly and a left-side assembly as viewed from the vantage of this example. The two separate corral assemblies act to distribute the weight of corral 100 over the length of trailer 101 and to facilitate simple mounting and dismounting of the corral with respect to trailer 101. Corral 100 comprises, in this example, 4 corral panels, 104, 116, 111, and 103, and a corral gate 102. The right-side assembly of corral 100 comprises panels 104, 116, and gate 102. The left-side assembly of corral 100 comprises panels 111 and 103. The specific number of panels illustrated in this example is not required in order to practice the present invention. In one embodiment, there may be only one panel per left and right-side assemblies and one gate, which mat be affixed to either assembly.

In this example, corral 100 is illustrated fully dismounted from trailer 101 and in a set-up position with gate 102 closed. A latch 112, logically illustrated herein by a dotted circle enclosing the adjacent corners of gate 102 and panel 103 is provided to secure gate 102 in a closed position when corralling animals. Any type of standard latch mechanism may be provided for the purpose of securing gate 102 to panel 103. Examples include a bar-pin type latch, a chain latch, a levered pin-lock latch, and so on. There are many known latch configurations and methods known any one of which may be used.

Panels 104, 116, 111, 103 and gate 102 are, in a preferred embodiment fabricated of hollow, square tubing approximately 1-inch square with a ⅛-inch wall. Gate 102 is constructed of the same material and configuration as the panels however; this is not required in order to practice the present invention. Panels 104, 116, 111, and 103 and gate 102 may be manufactured of alternate size tubing of generally square or rectangular shape. Moreover, other suitably strong and lightweight materials may be used for tubing such as aluminum or other lightweight metals.

In preferred applications the tubing is square or rectangular because of the way the panels are connected together using piano hinges illustrated herein as hinges 105 (one in each assembly) and hinge 118, which is identical to hinges 105 with the exception that it is reversed in installation allowing gate 102 to swing in an opposite direction than panels 104, 116, 111, and 103. Construction of the panels and the gate of corral 100 is achieved by welding vertical and cross-members together to form the panel and gate configuration. Many variations of configuration may be used. In this example, each panel comprises a top and bottom cross member supported by 4 vertical members. The vertical members are further supported by 3 cross-members, which are substantially centered and shorter than the top and bottom members. Gate 102, in this example, most clearly exhibits the just-described configuration.

One vertical support member on each of panels 104, 116, 111 , and 103 including one on gate 102, is provided of a length dimension longer than other vertical members to serve as a leg 113. There are 4 panels and one gate, hence, there are 5 legs 113 adapted to support corral 100 as it rests on the ground. Each leg 113 has a foot provided thereon and adapted with an opening through which a stake similar to a tent stake or anchor stake may be driven to secure corral 100 in its set-up position on the ground.

A novel method and apparatus is provided to attach corral 100 to trailer 101. A left carriage device 115, illustrated in FIG. 1 within a dotted rectangle, is provided and adapted to secure the left-side assembly of corral 100 to trailer 101. A right carriage device 107, also illustrated within a dotted rectangle, is provided and adapted to secure the right-side corral assembly to trailer 101. Carriage devices 115 and 107 each comprise a slidable carriage mounted on tubular runners with the carriage attached to a hydraulic lift mechanism, which when operated, moves the carriage up or down on the runners facilitating lifting and lowering of corral 100. In this example, the lift mechanisms are manually operated hydraulic jacks. In alternative embodiments, they may be electronically and remotely operated. In still another embodiment ratchet-style lift mechanisms may be used.

Base plates and upper-mounting plates are provided to secure the tubular runners of each carriage assembly 115 and 107 in a substantially parallel and spaced apart configuration. The base plates also are also used for mounting the lower portion of each carriage assembly to running board 108. The upper mounting plates are also used for mounting the upper portion of each carriage device 115 and 107 to the trailer wall of trailer 101. More detail regarding components of carriage devices 115 and 107 will be provided further below.

In a preferred embodiment, each carriage device 115 and 107 supports attachment to respective left-side and right-side corral assemblies through provision of hinges 119 (two per side). With respect to the right-side corral assembly, hinges 119 are, in a preferred embodiment, welded directly to the carriage portion of carriage device 107 and to the first vertical member of panel 104. On the left-side device, hinges 119 are not welded directly to the carriage portion of 115, rather they are welded to brackets supported by an extra off-set bar (not illustrated) adapted to off-set the hinge location both toward the center of trailer 101 and toward gate 102 in this example. This is so that panels 1 11 and 103 may be folded directly over panels 104, 116 and gate 102 after they are folded against the wall of trailer 101 during trailer mounting of corral 100. More detail regarding this unique aspect of the invention will be provided further below.

Brackets 110 are provided and adapted to mount to the wall of trailer 101 at a strategic location for the purpose of supporting corral 100 when it is folded and secured against trailer 101. Although it is not clearly visible in this example, brackets 110 function as shelves extending out from trailer 101 past the folded width of corral 100, each bracket having a hinged upper flap, which also extends past the folded width of corral 100. Vertically aligned openings provided through the shelf portion and upper flap portion of each bracket are adapted to accept a large T-nut or other locking mechanism for the purpose of locking corral 100 in a folded position against trailer 101 when traveling or when the corral is not being utilized. Other types of known locking mechanisms that may be used include, but are not limited to, master-locks, chain-lock mechanisms, tethers, pin-lock mechanisms and so on.

In practice of the present invention a single user may set-up corral 100 exerting moderate effort in a small amount of time. Re-mounting corral 100 to trailer 101 is also possible for a single user exerting little effort in short order. The weight of corral 100 is distributed over the right-side and left-side assemblies, which are separately lifted and lowered during set-up and remounting of corral 100. The hydraulic lift mechanisms are strategically located to provide a user with easy access and optimum positioning for lifting, unfolding, and lowering each of the right-side and left-side corral assemblies. The added strength of the double-runner carriage configuration (115, 107) and heavy duty hinges (119) enable the intrinsic weight of both corral assemblies to be lifted and lowered without supporting the free ends of each corral assembly whether unfolded or not.

A built-in flexibility exists within each corral assembly enabling it to conform adequately to un-even ground such that all of the corral legs 113 touch the ground when set-up. This flexibility is provided by the hinging technique used in construction with respect to barrel-type hinges 119, and piano type hinges 105 and 118. Moreover, corral legs 113 are strategically located and adapted to act as balance points when swinging panels and gate to a folded position before re-mounting corral 100 to trailer 101 after use. In one embodiment, all, or certain ones of corral legs 113 may be provided with slidable extensions mechanically inserted into the hollow end portions thereof and adapted for the purpose of conforming to wide disparities in levelness of the ground, which the corral rests on in set-up position.

Figure 2:
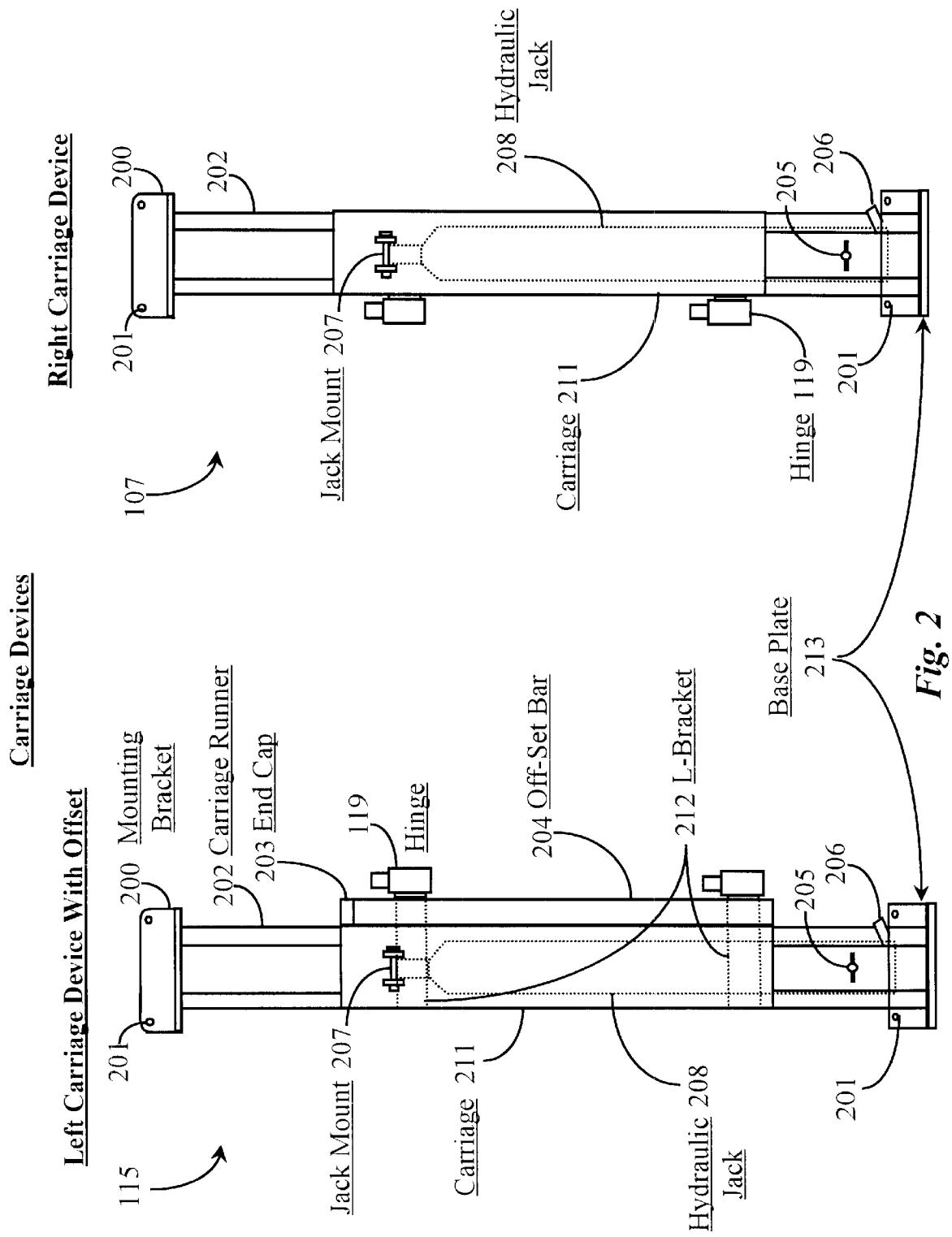
FIG. 2 is a plan view of the left and right carriage devices of FIG. 1.

FIG. 2 is a plan view of the left and right carriage devices 115 and 107 respectively of FIG. 1. Both right carriage device 107 and left carriage device 115 comprise each a slidable carriage, illustrated herein as carriage 211 mounted on tubular runners 202. Carriage 211 fits on runners 202 and is freely slidable along the runners as previously described with reference to FIG. 1. The arrangement described immediately above allows for vertical lift, which is facilitated in this embodiment by a hydraulic lift mechanism or hydraulic jack 208 (one per carriage device).

Referring first to right carriage device 107 illustrated on the right side of FIG. 2, a framework for the device comprises a mounting bracket 200, carriage runner 202, and a base plate 213. Carriage runners 202 are of a length dimension that allows sufficient vertical clearance as is required for hydraulic jack 208 to lift the corral assembly form ground level to its stored position on horse trailer 101. Jack 208 has a hydraulically operated arm, which is attached to carriage 211 using a suitable jack-mount 207.

Runners 202 can be manufactured of a material such as steel which is strong enough to sustain the weight of the corral assembly and which can be welded or threaded for screw-fit to top mounting bracket 200 and to base plate 213. It is noted herein that other metals may also be used. When fixed to bracket 200 and base plate 213, runners 202 are secured in a parallel and spaced-apart configuration. This parallel and spaced configuration of runners 202 provides a "track" upon which carriage 211 travels. Bracket 200 and base plate 213 each have two openings 201 provided which allow for a fastener such as a bolt, or other suitable type fastener as may be found in current art, to be passed through openings 201 to secure bracket 200 and base plate 213 to trailer 101.

Carriage 211 is, in a preferred embodiment, manufactured of a suitable material such as steel. Steel is preferred because of a sufficient strength and properties facilitating welding of various attachments to the carriage such as hinges 119 and jack mount 207. In one embodiment, carriage 211 may be fabricated as a hollow rectangle of such dimensions to fit closely around carriage runners 202 to maintain true tracking ability but with enough clearance to prevent binding. In yet another embodiment, carriage 211 may be formed as a wrap-around style enclosure providing rectangular tracks for runners 202 but leaving the back-side open. In yet another embodiment, carriage 211 may be formed of a solid rectangular block with two channels bored through from top to bottom to accommodate runners 202.

Hinges 119 (see FIG. 1) are affixed, preferably by welding, to carriage 211 in strategic placement for supporting a panel. Hinges 119 are, in this example, barrel hinges well known in the art. The sturdy construction of barrel-type hinges allows maximum weight support during swing-out and extension of corral panels of the corral assembly. Corresponding hinge components are attached in strategic locations to corral panels 104 and 111 described with reference to FIG. 1.

Jack 208 is provided to enable lifting of carriage 211 vertically on runners 202 as was previously described. Jack 208 is illustrated in this example with a dotted line to allow viewing of other details. Otherwise jack 208 would be fully visible in this view. The base of jack 208 is fixed to base plate 213 and the top or lifting portion of the jack is fixed to jack mount 207 on carriage 211. In one embodiment, jack 208 may be fixed at top and bottom by welding. In this example, jack 208 is bolted to carriage device 107.

A jack handle (not shown) is inserted into a jack handle insert, illustrated herein as insert 206, and operated in typical manner to effect lifting of carriage 211. When the jack handle is removed from insert 206 and placed on jack release 205, a counter-clockwise twisting motion is applied by a user to lower jack 208, hence carriage 211. Hydraulic jack handles, as found in current art, typically have a slot cut into the end of the handle to fit over the "T" shaped releases 205.

Referring now to Left Carriage Device With Offset (115) illustrated on the left side of FIG. 2, left carriage device 115 comprises all previously described components and functions described of right carriage assembly 107 with the addition of modifications for producing an offset related to strategic positioning of hinges 119. The offset modifications are provided to allow clearance for left-side corral panels 103 and 111 of FIG. 1 to fold flat up against right-side corral panels 104, 116 and gate 102 after they are folded against wall of trailer 101 in the stored position described with reference to FIG. 1.

In left carriage device 115, hinges 119 are not welded directly to carriage 211 but instead are welded to an offset configuration comprising an off-set bar 204 (for support) and two L-brackets 212. L-brackets 212 are illustrated in FIG. 2 as dotted lines traversing horizontally across carriage 211 in two strategic locations, one at approximately the position of jack mount 207, and one across the base portion of carriage 211. In this embodiment, both L-brackets 212 are welded across the backside of carriage 211 with the "L" portion of the bracket extending out and away from trailer 101 (FIG. 1). L-brackets 212 are adapted as welding locations for hinges 119. Extra support for brackets 212 is provided by off-set bar 204. More detail on the placement of L-brackets 212 will be described further below.

Offset bar 204 is provided and adapted to lend physical support to the offset locations of hinges 119, which are off-set in a direction both toward the center of trailer 101 and toward gate 102 as seen in FIG. 1 above. Referring now back to FIG. 1, with hinges 119 in the offset location on left carriage device 115, left-side corral panels 103 and 111, when folded into the storage position, allow suitable clearance between their folded location and the body of trailer 101. This clearance, which can be described as parallel clearance, allows right-side corral panels 104, 116 and gate 102 to fit flat or flush against trailer 101 while left-side panels 103 and 111 fit flat or flush against panels 104 and 116 comprising a completely folded corral.

In this embodiment, offset bar 204 is manufactured of a hollow square material such as steel which has suitable strength and which accommodates the welding of various attachments to it. If a hollow square material is utilized, a "finishing" top piece, illustrated herein as an end cap 203, is provided to close the top opening of bar 204. In one embodiment, a solid square or annular shaft may be used in place of off-set bar 204.

In this example, off-set bar 204 is fixed to carriage 211 and to L-brackets 212 by welding. Hinges 119 are also fixed by welding to L-brackets 212 in strategic locations, which correspond to locations of hinge components on corral panel 111 of FIG. 1.

Figure 3:
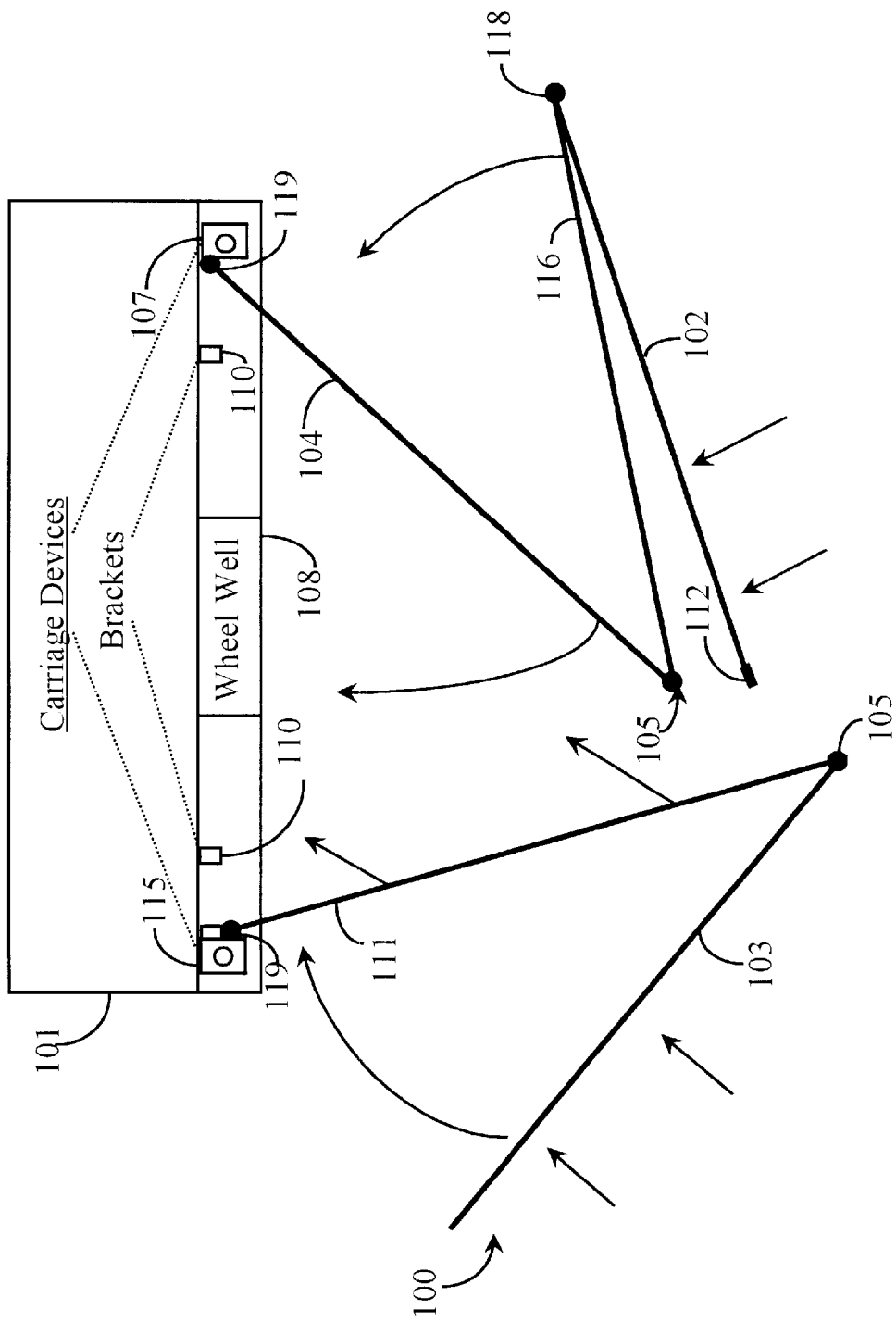
FIG. 3 is a block diagram illustrating a process of folding the portable horse corral of FIG. 1 viewed from an overhead vantage point.

FIG. 3 is a block diagram illustrating a process of folding the portable horse corral 100 of FIG. 1 viewed from an overhead vantage point. In this example, carriage devices 115 and 107 as well as brackets 110 are illustrated as mounted and fixed in place on trailer 101. The process of folding corral 100 of FIG. 1 into storage position on trailer 101 begins with folding in and storing the right-side corral assembly. With hinge 118 as a pivot point, gate 102 is folded in a clockwise direction as indicated by the illustrated directional arrows until gate 102 is flat against and parallel with panel 116. Next, with hinge 105 as a pivot point, gate 102 and panel 116 are folded together in a counter-clockwise direction as indicated by the illustrated directional arrows until panel 116 and gate 102 are flat against and parallel with panel 104. Finally, with hinges 119 as a pivot point, gate 102 panel 116 and panel 104 are folded in a counter-clockwise direction as indicated by the illustrated directional arrows until panel 104, 116 and gate 102 lie flat against trailer 101 and rest on brackets 110. Corral legs 113 (not shown) occur at locations of hinges 105, 118 and latch 112 and are strategically positioned to clear wheel well 108 when right-side corral assembly is mounted in the stored position on trailer 101 and resting upon brackets 110.

Referring now to the left-side corral assembly, with hinge 105 as a pivot point, panel 103 is folded in a clockwise direction as indicated by the illustrated directional arrows until panel 103 rests flat against panel 111. Next, with offset hinges 119 as a pivot point, panels 103 and 111 are folded together in a counter-clockwise direction as indicated by the illustrated directional arrows until panels 103 and 111 lie flat against the already stored right-side corral assembly resting in mounted position on brackets 10. Similar to the right-side corral assembly, left-side corral legs 113 (not shown) occur at locations of hinges 105 and at the free end of panel 103 and clear wheel well 108 when the left-side corral assembly is mounted in stored position on trailer 101. More detail on the placement and operation of hinges 105 and 118 is provided further below.

It will be appreciated by one with skill in the art that when mounting corral 100 to trailer 101, the right-side corral assembly is stored first followed by the left-side corral assembly. The reverse is true when setting up corral 100 for use. It will also be appreciated that right carriage device 107 and left carriage device 115 are operated in the same order. It is noted herein that there are two locations at which a user stands during lifting stowing or setting-up corral 100. Each location is just to the left of each carriage device (each jack has a right-side lift-handle location). In this way, a user is always in a position to be able to operate each carriage device and to effect mounting of folded corral assemblies on brackets 110 without substantial movement away from the current lifting position. When the right-side corral assembly is loaded against trailer 101 a user simply moves to the opposite lifting position to effect lifting of the left-side corral assembly. It is also noted herein that in one embodiment there is only one panel per side eliminating certain folds and associated hinges.

Figure 4:
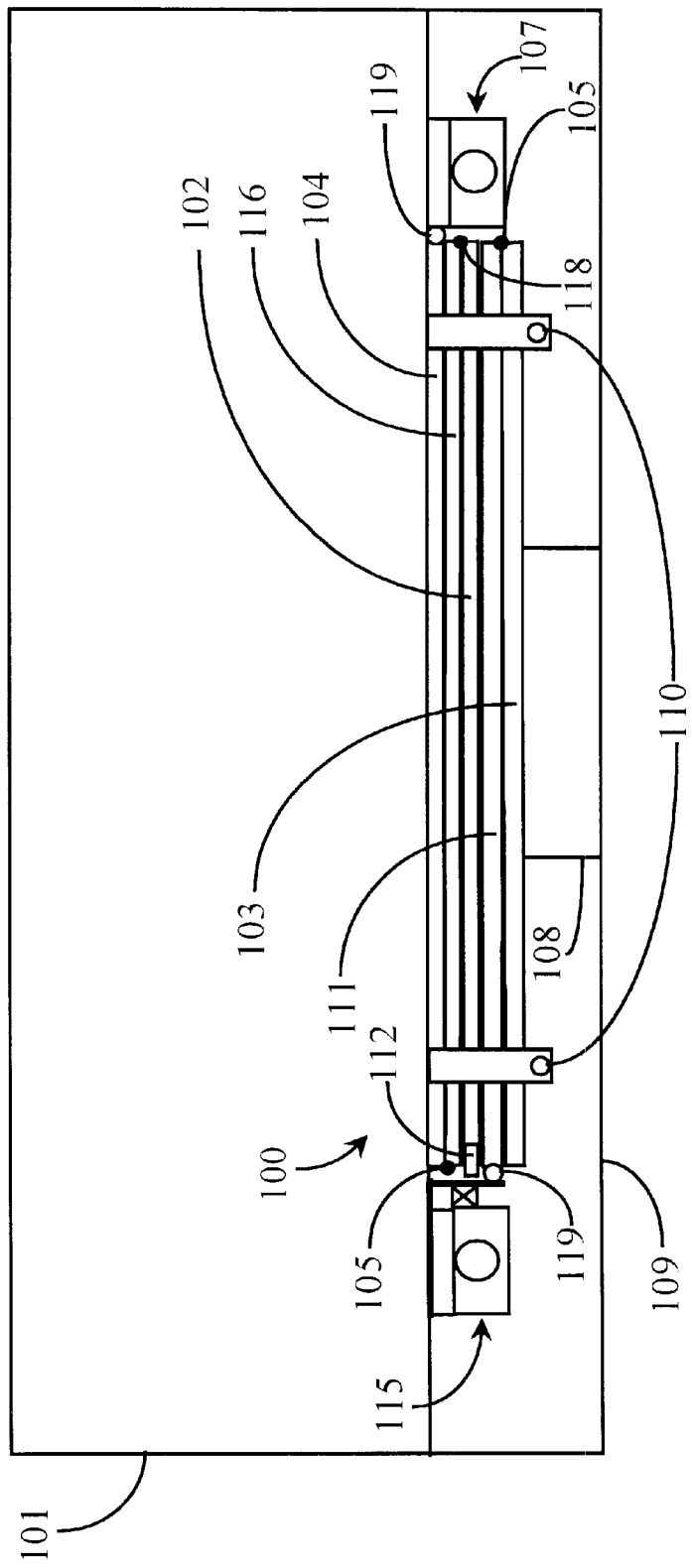
FIG. 4 is a block diagram illustrating the portable corral of FIG. 1 completely folded and mounted as viewed from an overhead vantage point.

FIG. 4 is a block diagram illustrating portable corral 100 of FIG. 1 completely folded and mounted as viewed from an overhead vantage point. In this example, carriage assemblies 115 and 107 as well as brackets 110 are illustrated as mounted and fixed in place on trailer 101. As previously described in the folding process of FIG. 3, the sequence of folding and mounting the panels and gate of corral 100 into a stored position on trailer 101 starts with the right-side corral assembly and results in panel 104 being in a position closest to the wall of trailer 101 with panel 116 in the next position, followed by gate 102. Right-side assembly hinge 119 is fixed in a position on carriage assembly 107 that enables first panel 104 to lie flat against trailer 101. Subsequent hinges 105, 118 and latch 112 are shown in their respective position on panels 116 and on gate 102 all lying flat and flush against trailer 101.

Referring now to left carriage assembly 115, hinge 119 is illustrated in its offset position as previously described in FIG. 2. Also apparent, but not shown, is the position of previously described L-brackets 212, which extend across the backside of carriage assembly 115 and out towards the center of trailer 101 for a distance just greater than the width of offset bar 204. L-brackets 212 then form a right angle away from trailer 101 and extend out to provide the desired offset and fixed attachment location for hinges 119. The offset of left-side hinges 119 allow panel 111, which is the next panel to be folded in, to lie flat against gate 102 as is illustrated herein. Finally, panel 103 is illustrated in a position furthest from trailer 101, being the last panel to be folded in. Hinge 118 is illustrated in its respective position between panel 116 and gate 102. All legs 113 occur at points furthest from the center of all panels and the gate, and thus clear wheel well 108 when in stored position.

Brackets 110 are illustrated with hinged upper flaps in a closed position over the top of all panels and gate 102 as would appear when corral 100 is properly stored on trailer 101. Also shown are strategic openings in brackets 110 which accommodate a locking mechanism, for example a T-nut, for the purpose of securing the folded assembly securely to trailer 101. More detail of bracket 110 is provided further below.

The use of hinges 105 and 118 enables corral 100 to be stored flat against trailer 101 within a minimum width profile of about six inches in actual practice, well within the limits of running board 109. It is reminded herein that hinge 118 is identical in construction to hinges 105, however it is installed in reverse configuration to allow gate 102 to swing in a direction opposite the swing direction of panels. The use of hinges 105 and 118 also enable maximum dimension construction with respect to the width dimensions of the members comprising the panels and gate. In prior-art as taught by Bolton, the sleeved construction requires that actual panel members be of substantially less diameter (tubing) therefore compromising durability. In a corral having only two panels, hinges 105 are not required.

Figure 5A:
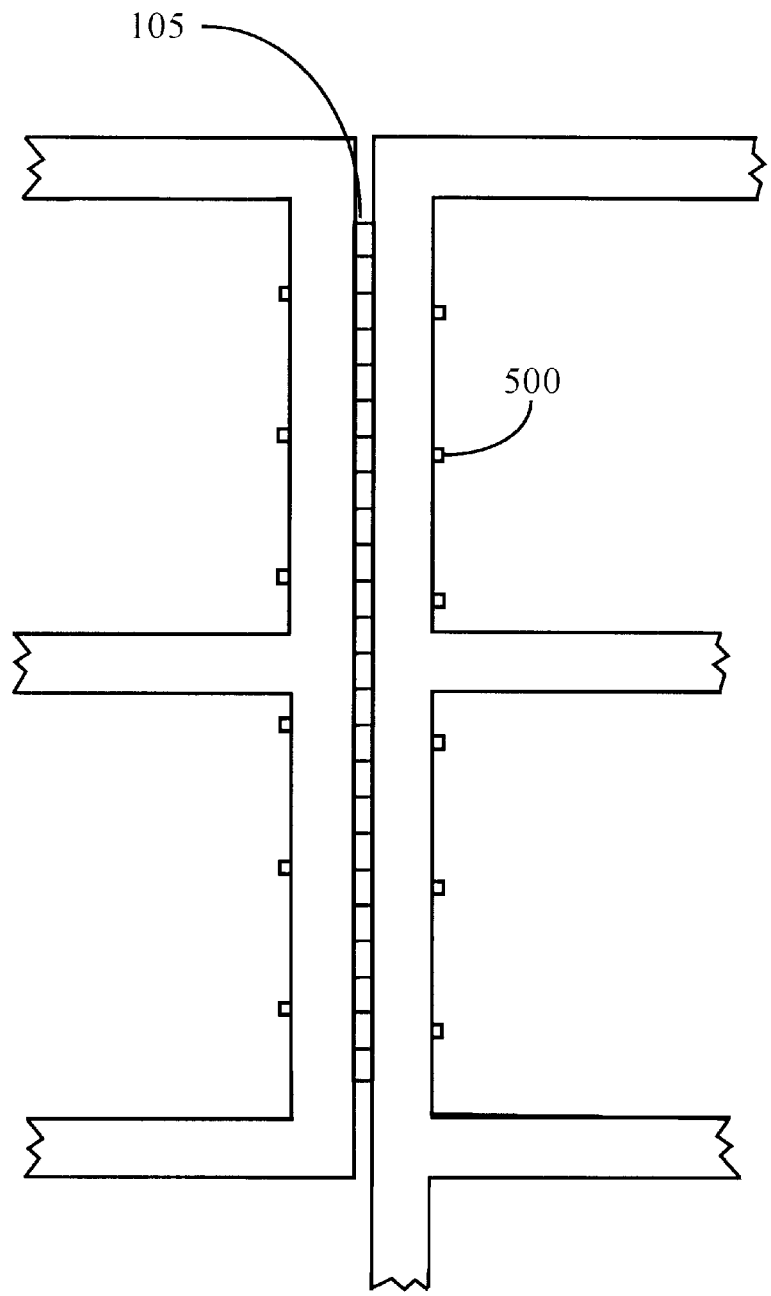
FIG. 5a is a plan view illustrating a hinge mechanism for conjoining adjacent panels of the horse corral of FIG. 1.

FIG. 5a is a broken view illustrating hinge mechanism 105 for conjoining adjacent panels of portable horse corral 100 of FIG. 1. In this example, a hinge 105 is illustrated fixed to two end vertical support members of what could be two panels or one panel and gate 102 (hinge 118). As would appear in a preferred embodiment of the invention, one end vertical support member serves as leg 113. Only the end portions of the panels or gate are illustrated in this example because only the end vertical support members of panels or gate are conjoined by hinge 105. Each end panel and leg have a plurality of openings provided (not shown) from the inside face of the panel or gate support member or leg to the outer-most face. These openings are provided in alignment with a matching array of plurality of openings (not shown) on hinge 105. When openings of hinge 105 are in proper alignment with the openings of a panel or gate, a fastener 500 is passed through in order to secure hinge 105. The fasteners can be any one of several typical types as found in current art, for example a nut and bolt, machine screw and nut, or rivets. In a preferred embodiment, the heads or nuts of fasteners 500 on one side of hinge 105 are fixed in such a position to be offset or staggered with respect to the corresponding heads or nuts of fasteners on the opposite side of hinge 105. Also in a preferred embodiment, the depth of the head or nut of fastener 500 does not exceed the width dimension of the space between panels, thus hinge 105 is allowed to close fully.

Figure 5B:
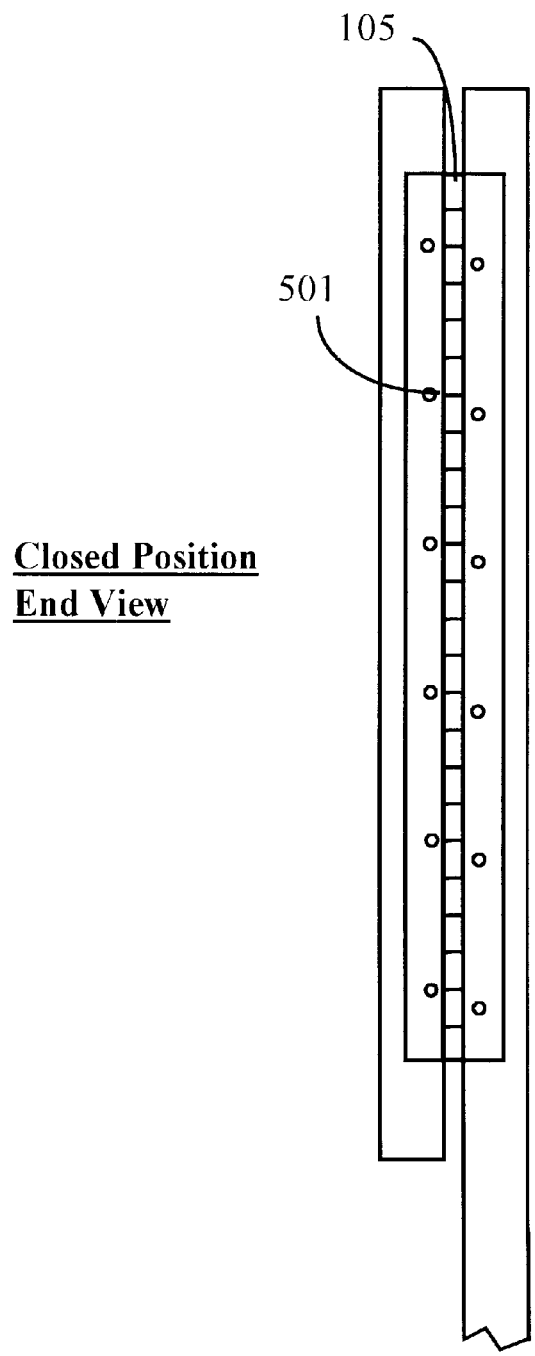
FIG. 5b is a plan view illustrating the mounted location of the hinge of FIG. 5a with the adjacent panels folded.

FIG. 5b is a plan view illustrating the mounted location of the hinge of FIG. 5a with the adjacent panels folded. In this example, hinge 105 is illustrated fully opened to 180 degrees and the adjacent panels parallel to each other. A plurality of openings 501 provided within hinge 105 are illustrated in a staggered or offset configuration as previously described in FIG. 5a. This plurality of openings 501 match a corresponding array of openings on a panel or gate (not shown) also as previously described and accommodates a common type of fastener 500 from FIG. 5a. When hinge 105 is closed (panels swung to open position), fasteners used to secure the hinge do not abut each other because of the offset positioning of openings 501. In this way, the space between adjacent panels is minimized.

FIG. 6a is a front view of bracket 110 of FIG. 1. Bracket 110 functions as a shelf unit and locking device that supports and secures portable corral 100 of FIG. 1 in a stored position on trailer 101 of FIG. 1. Bracket 110 illustrated in locked position in this example comprises a T-bolt 600, a hinged flap 601 and a shelf 603 supported for strength by a triangular web support 605. It is noted herein that vertically aligned openings (not shown) are provided through hinged flap 601 and shelf 603, which allow the passing through of T-bolt 600 or other suitable fastener.

Shelf 603 and hinged flap 601 are both fixed to a back plate 607 of bracket 110. Flap 601 is attached with a hinge mechanism (not shown) to the top edge of back plate 607. More detail of the hinge mechanism is provided further below.

Shelf 603 is attached to back plate 607, preferably by welding to the body of back plate 607 at a position on black plate 607 that provides a clearance dimension from flap 601 large enough to accept the horizontal support members of the panels and gate of corral 100 when corral 100 is in stored position on bracket 110. Shelf 603 is farther supported by triangular web support 605. Support 605 comprises 2 triangular plates welded near the outer edges of shelf 603 on both sides and to back plate 607 near its outer edges. The height dimension of back plate 607 is such that two openings 604 can be provided at strategic locations below the position of shelf 603. These openings function as mounting locations that serve the installation of bracket 110 onto trailer 101 of FIG. 1. In a preferred embodiment, bracket 110 is manufactured of a material with adequate strength and the ability to be welded, for example, steel. It is noted herein that other durable metals may also be used.

Figure 6B:
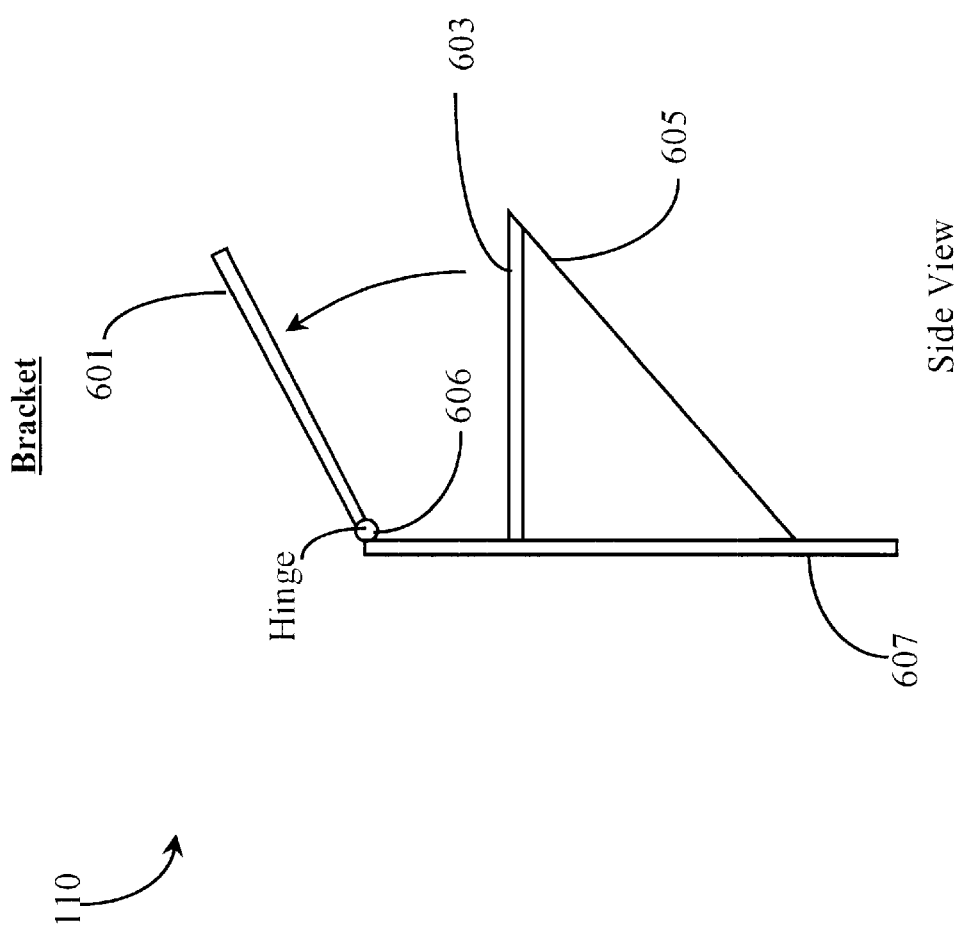

FIG. 6b is a side view of bracket 110 of FIG. 6a illustrated in an unlocked position. As previously described, bracket 110 functions as a shelf unit and locking device. The locking device assembly components in this example comprise hinged flap 601 and shelf 603. Hinged flap 601 is illustrated is a semi-open position, pivoting upwards and away from shelf 603 as indicated by the illustrated directional arrow. The pivot point and method of conjoining flap 601 to back plate 607 is a provided hinge mechanism 606. In one embodiment, hinge 606 is a common heavy-duty barrel-type as may be found in current art, and is fixed to flap 601 and to back plate 607 by welding. In an alternate embodiment, hinge 606 is fixed with fasteners, for example, nuts and bolts. It is noted herein that the length dimension of flap 601 and shelf 603 are substantially equal and are of a sufficient length to accept all horizontal cross members of portable corral 100 as illustrated with respect to FIG. 4 above, as well as a locking mechanism such as T-bolt 600 (FIG. 5a), when corral 100 is mounted in stored position and resting on brackets 110.

Also illustrated in clearer detail here is triangle web support 605. The length dimensions of the edges of support 605 that are fixed to shelf 603 and back plate 607 are equal, in this example, to the length dimension of shelf 603. The triangular configuration is that of a right triangle having equal sides. Providing maximum contact support along the length of shelf 603 optimizes the strengthening and stabilizing function of support 605.

In a preferred application, the corral system of the present invention is portably mounted to a standard horse trailer or other animal transport vehicle capable of supporting it. It may be provided separately for custom mounting to a trailer already owned by a user or it may be provided already mounted and ready for operation with a trailer at the time of purchase by a user. There are many use possibilities. However, the corral system of the present invention is not limited to trailer or vehicle mounting. It may also be utilized as a foldable corral mounted to a side of a structure analogous to a fixed or portable barn, the side of a house, or any other built structure.

Shipping and Installation Pallet

Figure 7:
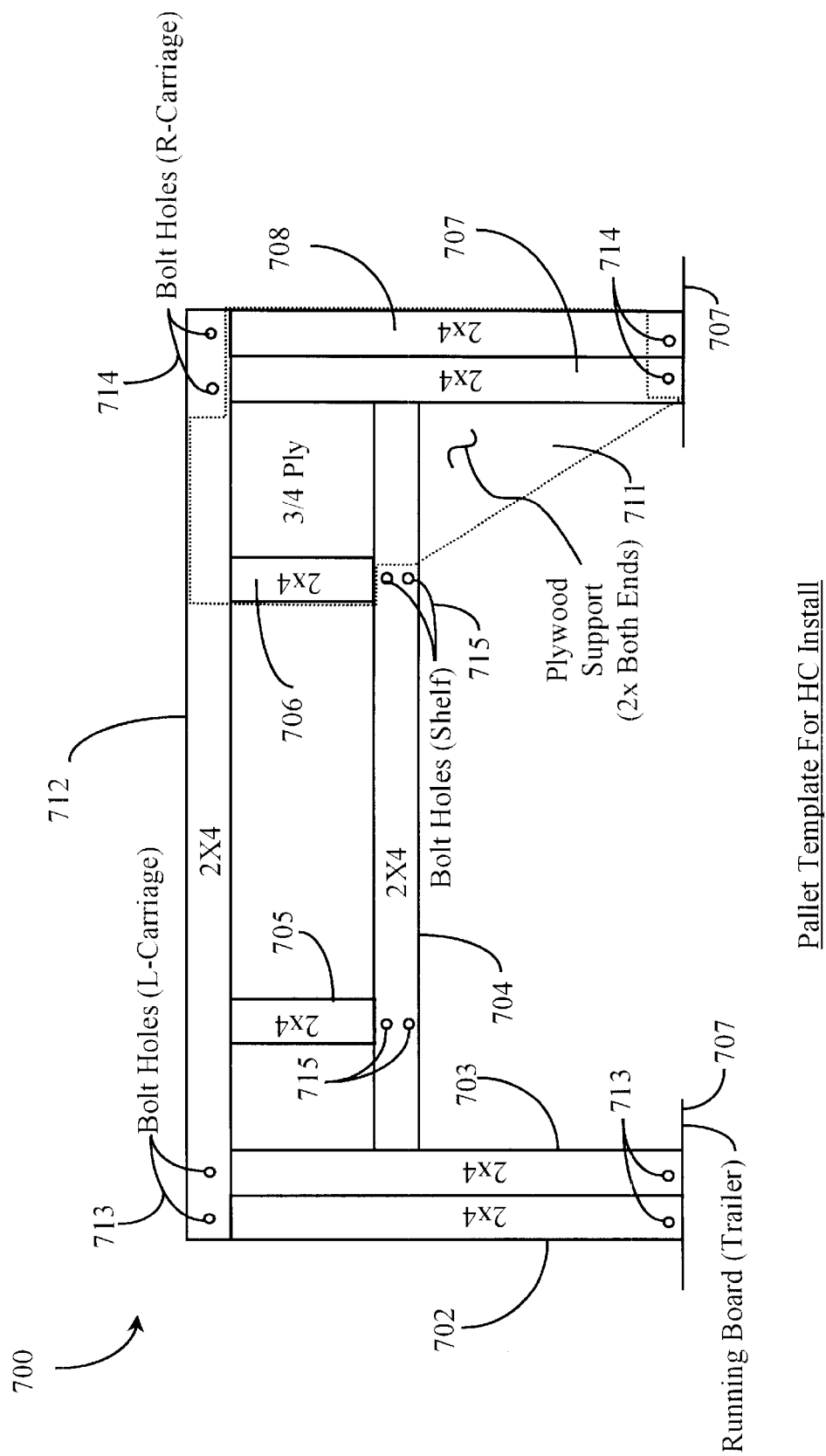
FIG. 7 is a plan view of a pallet template used to aid installation of the horse corral of FIG. 1 according to an embodiment a present invention.
Figure 8:
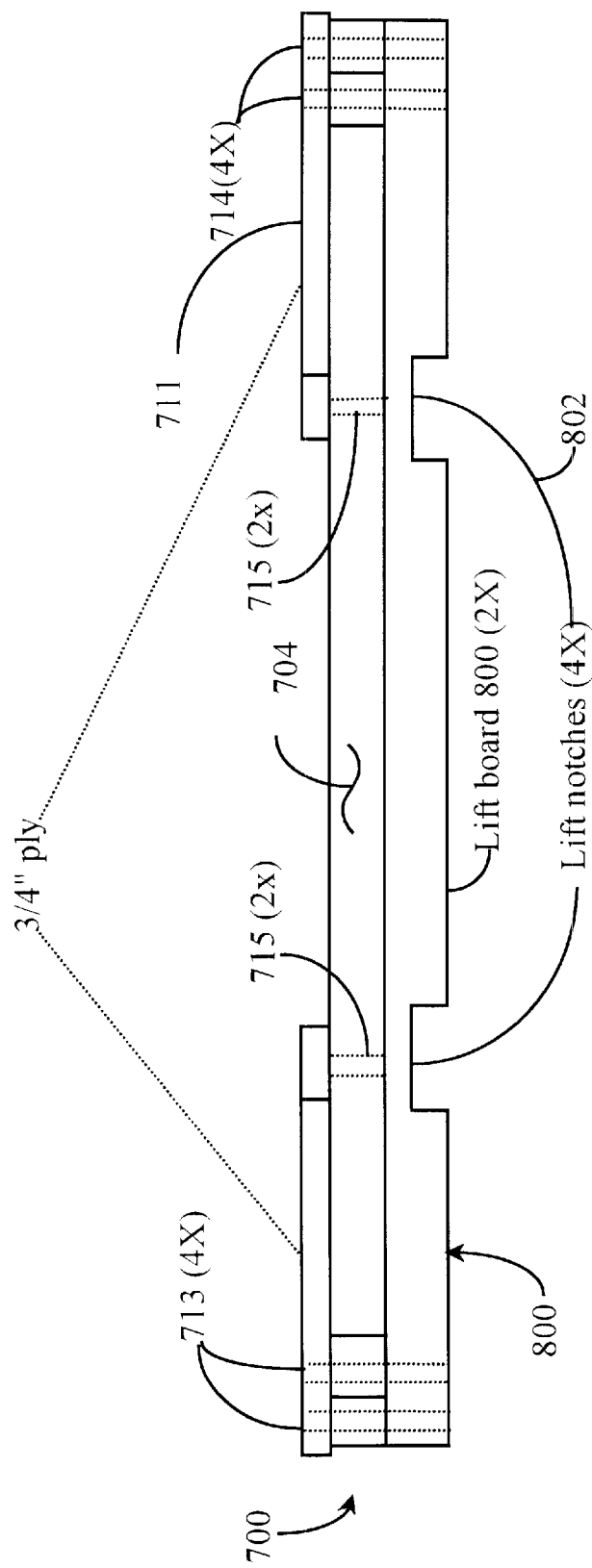
FIG. 8 is a side view of the pallet template of FIG. 7 illustrating added lift boards for facilitating forklift operation according to an embodiment of the present invention.

In another aspect of the present invention, a unique and novel shipping and installation apparatus is provided in addition to portable corral 100. The apparatus enables quick and accurate installation of corral components to trailer 101. Provision of this novel apparatus is an enhanced improvement for users contemplating installation methods of prior art, for example, the portable folding corral of Bolton, which does not include a template type installation pallet. FIGS. 7 and 8 described below illustrate the novel and unique attributes of this method and apparatus.

FIG. 7 is a plan view of a pallet template 700 used to aid installation of portable corral 100 of FIG. 1 according to an embodiment of the present invention. Pallet 700 is provided and adapted for use in the shipping of and subsequent initial installation of portable corral components of the present invention onto a horse trailer. Pallet 700 functions as a shipping and handling pallet and is designed to hold corral 100 including carriage devices fully assembled. A plurality of openings 713, 714, and 715 are provided through pallet 700 in strategic locations that match the size and positioning of the required array of openings that must be provided through the wall of trailer 101. In this way, installation is by template enabling elimination of measuring and confusion that can result in ad hoc installation.

The construction of pallet 700 comprises a reinforced framework of 2×4s arranged in a pattern that substantially matches the mounted configuration of corral 100 when corral 100 is in a folded position and mounted position. The 2×4 framework of pallet 700 comprises left carriage vertical support members 702 and 703, a bottom cross-member 704, a left and right vertical support member 705 and 706, right carriage vertical support members 707 and 708, and a top cross-member 712. In a preferred embodiment, the 2×4s are arranged next to each other in proper configuration on a flat surface. In this arrangement, they may be glued, stapled, or nailed together. In alternate embodiments, sheet-metal fasteners nailed or stapled to the 2×4s may secure the framework before reinforcement.

Pallet 700 is reinforced by means of two-¾inch plywood supports 711 one support installed per side (only one support illustrated). In this example, support 711 is illustrated as a dotted polygon in order to show detail of underlying 2×4 framework, but in actual practice, support 711 is fully visible and secured to the top of pallet 700. The shape of support 711 is designed to function as a large corner bracket which lends added strength to the 2×4 framework as well as proving shearing stability to the framework. In one embodiment, support 711 is secured to the 2×4 framework members by a plurality of screws or nail fasteners (not shown). In one embodiment, staples or other fastening mechanisms may be used.

Strategic cutout areas are provided through support 711 at the locations around the various mounting openings 713, 714, and 715. The cutouts leave the openings visible and accessible to a user without having to remove support 711 from pallet 700. In this example, cut-away portions of support 711 are illustrated as strategically occurring at two locations of right carriage openings 714 (4×), and at location of shelf openings 715 (2×). A mirror image of support 711 (not shown) is provided and adapted for the left side of pallet 700, wherein the cut-away sections over the left carriage assembly area would reveal left carriage openings 713 (4×) and shelf opening 715 (2×).

With plywood supports 711 attached thereto, pallet 700 is sufficiently strong for shipping and handling. Openings 713 and 714 serve as mounting locations for left and right carriage devices 115 and 107 respectively as described with reference to FIG. 1. Devices 115 and 107 are mounted to pallet 700 in the same configuration as required on a trailer analogous to trailer 101 of FIG. 1. Brackets 110 of FIG. 1 mount at the locations of openings 715 in the same preferred configuration for mounting to trailer 101.

In a preferred method of use, corral 100 comes fully assembled and folded on pallet 700. A user, after receiving corral 100, removes the corral components from pallet 700 and then places pallet 700 upright against a trailer with the bottom ends, illustrated herein as ends 707 of pallet 700 resting on the running board. Holding pallet 700 in place and upright against the trailer, the user then uses pallet 700 as a template to place the required openings for trailer mounting through pallet 700 and into and through the trailer wall. It is noted herein that suitable mounting back plates (not shown) are provided for securing mounts to the inside wall of a trailer analogous to trailer 101 of FIG. 1. In this example only the useful template portions of pallet 700 are illustrated to avoid confusion. However, additional 2×4 members are provided for facilitating forklift operation common to shipping and handling.

FIG. 8 is a side view of pallet template 700 of FIG. 7 illustrating added lift boards 800 for facilitating forklift operation according to an embodiment of the present invention. As previously described, pallet 700 functions as a shipping and handling device in addition to its installation template function. In this example, a side view is provided illustrating some of the previously described components of the 2×4 framework and reinforcement members of pallet 700. Visible in this view are cross-member 704, and plywood supports 711 (2×). Also illustrated but not labeled are the bottom ends of 2×4 members 702 and 703 on the left side and of 2×4 members 707 and 708 on the right side all of FIG. 7. Dotted lines are illustrated to indicate locations of left and right carriage assembly installation openings 713 (4×) and 714 (4×) as well as bracket installation openings 715 (4×).

In this example, shipping function using a standard forklift is facilitated by means of the addition of lift boards 800 (2×). Lift boards 800 are provided with lift notches 802 (4×) cut therein which enable the "forks" of the forklift to be inserted under pallet 700 for the purpose of lifting the pallet. It is noted herein that two lift boards 800 are required for proper forklift utilization. In this example, only one lift board 800 is visible and is illustrated in a position spanning across the bottom configuration of 2×4 members 702, 703, 707 and 708 and having a length dimension equal to overall width dimension of pallet 700. Dotted lines as previously described indicating the location of installation openings 713 (4×) and 714 (4×) are illustrated extending through lift board 800 and thus, lift board 800 for the purpose of extending mounting capability of corral carriage devices.

An identical lift board 800 (not visible) is positioned directly beneath across the top member 712 of pallet 700 as viewed with respect to FIG. 7. Lift notches 802 (4×) are, as a result of lift board installation, in proper alignment with each other to accept the forks of a forklift. Dotted lines illustrating the location of bracket installation openings 715 (4×) are shown through the width of member 704 only and not through lift board 800, because a lift board 800 is not provided at the mid-section position. In a preferred embodiment, lift boards 800 are fixed to pallet template 700 by bolts used for mounting the corral carriage devices to pallet 700. In order to use pallet 700 as an installation template, lift boards 800 are first removed along with mounted corral components.

One with skill in the art will recognize that the method and apparatus of the present invention provides considerable improvement over prior-art methods and apparatus for enabling a portable corral. For example, the weight of corral 100 is distributed over the length of its installation to a trailer wall and provided as two separate assemblies, which may be lifted and lowered separately by a single user. The novel hinged construction and the lifting method and apparatus employed enables corral 100 to be manufactured considerably larger than prior-art portable corrals thereby providing a larger perimeter and more durable enclosure.

In one embodiment of the present invention, corral 100 may be provided with an in-dash or remote controlled mechanism for electrically lifting hydraulic components of corral 100 instead of using manual-lift jacks. There are many variant possibilities for providing corrals of differing perimeters and panel lengths as may be desired for custom fitting to specific type and or style vehicles.

The method and apparatus of the present invention should be afforded the broadest scope under examination. The spirit and scope of the present invention is limited only by the claims, which follow.

What is claimed is:

1. A portable corral system mountable to a trailer for enclosing animals comprising:
   a first portion of the corral system having at least one corral panel and a corral gate connected together at their common junction(s);
   a first lifting mechanism mounted to the trailer and connected to the panel of the first portion of the corral system at an end not connected to another panel or gate;
   a second portion of the corral system having at least one corral panel connected together, in the case of more than one panel, at their common junctions; and
   a second lifting mechanism mounted to the trailer and connected to the panel of the second portion of the corral system at an end not connected to another panel;
   characterized in that a user operating either the first or second lifting mechanism may cause lifting and lowering of either portion of the corral system connected thereto.

2. The corral system of claim 1, wherein the first and second lifting mechanisms each comprise a hydraulic jack operably mounted to a carriage device.

3. The corral system of claim 2, wherein the carriage device comprises at least a top plate, a base plate, a carriage and at least two carriage runners enabling the carriage to side freely.

4. The corral system of claim 1, wherein piano style hinges are used to connect the panel(s) and gate of the first portion of the corral system.

5. The corral system of claim 1, wherein piano style hinges are used to connect the panels of the second portion of the corral system in the case of more than one panel.

6. The corral system of claim 1, wherein the first and second portions of the corral system are modular and interchangeable with respect to mounted position on the trailer.

7. The corral system of claim 2, wherein the hydraulic Jacks are manually operated.

8. The corral system of claim 2, wherein the hydraulic jacks are electronically operated.

9. The corral system of claim 1, wherein the first and second lifting mechanisms each comprise a ratchet style Jack mounted to a carriage device.

10. The corral system of claim 1, wherein at least two barrel style hinges are used to connect each of the first and second portions of the corral system to respective first and second lifting mechanisms.

11. The corral system of claim 10, wherein the hinges connected to one lifting mechanism assume an offset position in a direction toward the vertical center of the trailer and then away from the wall of the trailer with respect to the location of the hinges connected to the other lifting mechanism.

12. The corral system of claim 1, wherein the panels and gate making up the first and second portions of the corral system are supported off of the ground by vertical legs distributed one each for the panels and one for the gate.

13. The corral system of claim 12, wherein the vertical legs are contiguous and of the same material with respect to the host panels or gate.

14. A lifting device for a portable corral system, the corral system mountable to a trailer and having a first and second separable portion thereof the sum of portions including at least 2 corral panels and at least one corral gate connected together at their common junctions respective to their host portions comprising:
    at least two elongated runners held substantially parallel to one another and in substantially the same plane by a connected base plate and a connected top-plate;
    a carriage for traveling on the runners in a slidable manner;
    a jack having a bottom portion thereof fixedly mounted to the base plate and a lift aperture thereof fixedly mounted to the carriage; and
    at least two hinges attached to the carriage for securing a separable portion of the corral system to the lifting device;
    characterized in that operation of the lifting device causes the carriage to be raised and lowered along the length of the runners thereby causing lifting and lowering of the connected portion of the trailer-mounted corral system.

15. The lifting device of claim 14, wherein the device is mounted to the trailer at the locations of the base plate and the top plate.

16. The lifting device of claim 14, wherein the jack is hydraulic and is manually operated.

17. The lifting device of claim 14, wherein the jack is hydraulic and is electronically operated.

18. The lifting device of claim 14, wherein the jack is a ratchet style jack and is manually operated.

19. The lifting device of claim 14, wherein the carriage further comprises at least two L-brackets fixedly attached thereto and supported by an elongated vertical member positioned adjacent to the carriage, the vertical member attached to the carriage and to the L-brackets.

20. The lifting device of claim 19, wherein the at least two hinges are attached one per to the at least two L-brackets in order to provide an offset position for the hinges.

21. A method for setting up a trailer-mounted corral from a folded and locked position on the trailer, the corral having a first and second separable portion thereof each controlled by a separate hydraulic lifting device, the first portion having at least one panel and a gate, the second portion having at least one panel, the panel(s) and gate connected together at their common junctions respective to their host portions comprising steps of:

(a) unlocking the folded corral portions and removing the locking mechanisms;

(b) swinging out and unfolding the connected panel(s) of the second portion of the corral to a position substantially 90 degrees from the folded and locked position;

(c) swinging out and unfolding the connected panel(s) of the first portion of the corral, the position substantially 90 degrees from the folded and locked position; and (d) unfolding the gate of the first portion of the corral such that the free end of the gate may be latched to the panel of the second portion having a free end adapted to accept the latch.

22. A method for loading a trailer-mounted corral from a set up position to a folded and locked position on the trailer, the corral having a first and second separable portion thereof each controlled by a separate hydraulic lifting device, the first portion having at least one panel and a gate, the second portion having at least one panel, the panel(s) and gate connected together at their common junctions respective to their host portions comprising steps of:

(a) unlatching the gate of the first portion of the corral and folding it flush against its adjacent and connected panel by walking it into the corral;

(b) lifting the first portion of the corral until the leg of the panel closest to the trailer clears the ground;

(c) grasping the gate and its adjacent panel in folded position walking in towards the trailer accomplishing the final fold of the first portion of the corral;

(d) lifting the folded first portion of the corral to a position just above brackets and the running board of the trailer using the appropriate lifting device;

(e) positioning the folded first portion of the corral over the brackets and flush against the trailer while simultaneously lowering the first portion to rest on the brackets using the appropriate lifting device;

(f) lifting the extended second portion of the corral until the leg of the panel closest to the trailer clears the ground;

(g) grasping the panel furthest from the trailer at the free end and walking it in towards the trailer accomplishing a folded position of the two panels of the second portion;

(h) lifting the folded second portion of the corral to a position just above the brackets and running board of the trailer using the appropriate lifting device;

(I) positioning the folded second portion of the corral over the brackets and flush against the folded first portion while simultaneously lowering the second portion to rest on the brackets using the appropriate lifting device; and (J) inserting and engaging the locking mechanisms to lock the folded corral in place against the trailer.

23. The method of claim 22 wherein in step (c), there is only one panel and one gate eliminating the need for second fold.

24. The method of claim 22 wherein in step (g), there is only one panel eliminating the need for a fold.

* * * * *